United States Patent

Tew, Jr.

[15] 3,648,037

[45] Mar. 7, 1972

[54] SYMMETRICAL FUNCTION GENERATOR

[72] Inventor: Walter Hosey Tew, Jr., Deland, Fla.

[73] Assignee: General Electric Company

[22] Filed: Dec. 31, 1970

[21] Appl. No.: 103,034

[52] U.S. Cl. ..........................235/197, 235/198, 340/324 A
[51] Int. Cl. ..........................G06f 15/34
[58] Field of Search................235/197, 150.53, 152, 92 CM, 235/198; 307/229, 220; 328/48, 49, 14; 340/324 A, 146.3

[56] References Cited

UNITED STATES PATENTS

| | | | |
|---|---|---|---|
| 3,432,845 | 3/1969 | Douglas et al. | 235/198 X |
| 3,444,319 | 5/1969 | Artzt et al. | 340/324 A X |
| 3,474,438 | 10/1969 | Lauher | 340/324 A |
| 3,497,760 | 2/1970 | Kiesling | 340/324 A |
| 3,582,936 | 6/1971 | Kite et al. | 340/324 A |

*Primary Examiner*—Joseph F. Ruggiero
*Attorney*—Raymond H. Quist, Allen E. Amgott, Henry W. Kaufmann, Frank L. Neuhauser, Oscar B. Waddell and Joseph B. Forman

[57] ABSTRACT

A mathematical function having horizontal symmetry is generated progressively for each vertical coordinate. A binary counter is set with the number of one horizontal coordinate for a particular vertical coordinate. Gate stages associated with each stage of the counter receive signals which set them sequentially with the numbers of all horizontal coordinates. When the gate stage number matches that contained in the counter an output signal is produced by every gate stage enabling a first AND gate. The outputs from the gate stages are also inverted to the complementary binary number and enable a second AND gate. The AND gate signals identify the two symmetrical horizontal coordinates associated with the vertical coordinate.

2 Claims, No Drawings

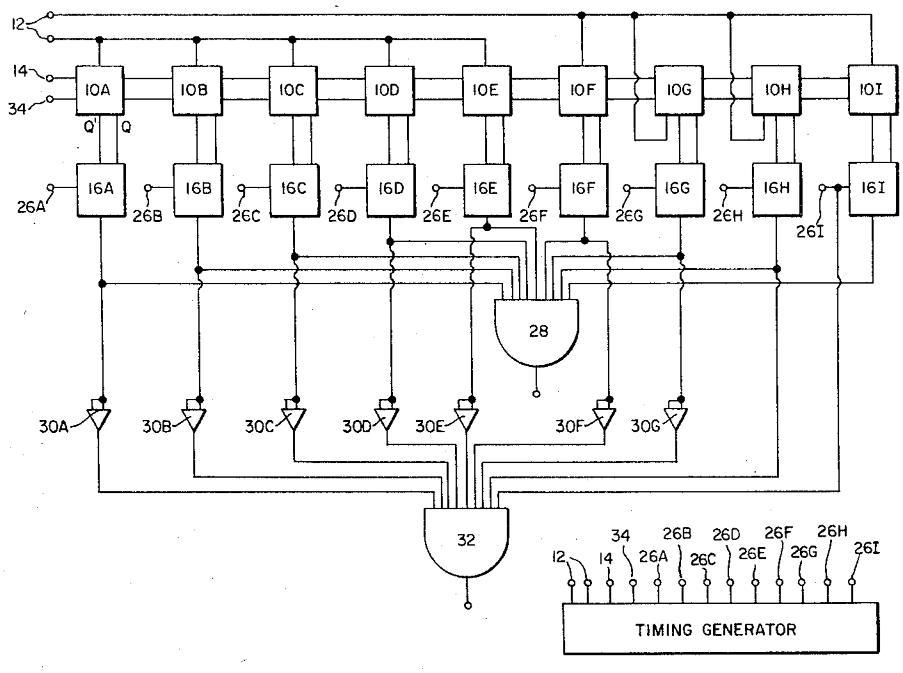

Patented March 7, 1972 3,648,037

2 Sheets-Sheet 1

INVENTOR.
Walter H. Tew, Jr.

BY

ATTORNEY.

Patented March 7, 1972 3,648,037

2 Sheets-Sheet 2

INVENTOR.
Walter H. Tew, Jr.
BY R H Quist
ATTORNEY.

SYMMETRICAL FUNCTION GENERATOR

BACKGROUND OF THE INVENTION

This invention relates generally to circuits for generating functions in digital form (for display on a cathode-ray tube, for example), and more particularly to symmetrical function generators.

Many functions have a symmetrical form which it is sometimes desired to generate in a repetitive manner. In a particular application it was desired to have an isosceles triangle displayed constantly on a cathode-ray tube. Each side (neglecting the base) of the triangle can be considered a linear function, and a separate function generator for each side could be used.

SUMMARY OF THE INVENTION

In a preferred form of the invention, a binary counter is set to contain the $x$ coordinate for the function to be displayed associated with the first scan line of $y$ coordinate. Timing signals are delivered to gating stages associated with each counter stage with each gating stage representing one binary digit. The gating stages sequentially contain the binary numbers associated with all of the elements. When the number in the counter matches that in the gating stages a first AND gate is enabled which produces a color control or light intensity control signal. Inverters connected to the gating stages and to a second AND gate produce a second control signal when the complement of the number contained in the counter is reached. The number in the counter is changed at the end of each scan line to the $x$ coordinate for the next scan line. Thus for each scan line or $y$ coordinate two output signals are produced representing the $x$ coordinates of the symmetrical function.

DESCRIPTION OF THE PREFERRED EMBODIMENT

Figure 1:
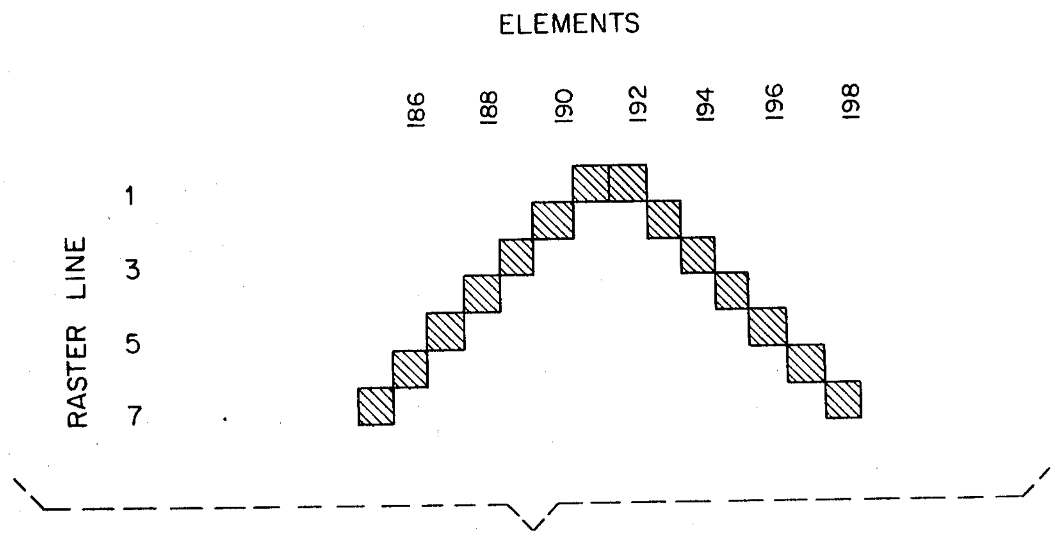
FIG. 1 illustrates a portion of a raster-type display having a symmetrical function thereon.

Referring to FIG. 1, a portion of a cathode-ray tube face is illustrated having a symmetrical figure (here, the top of a triangle) displayed thereon. Each raster line is made up of 384 elements with elements 191 and 192 of raster line 1 forming the vertex of the triangle. In each succeeding raster line two elements are required to form the triangle sides. The left or leading side is composed of elements the number of each of which is achieved by decrementing by 1 the number of the element in the previous raster line; i.e., 190, 189, 188, etc. On the right or trailing side the number of the element in the previous line is incremented by 1; i.e., 193, 194, 195, etc.

Figure 2:
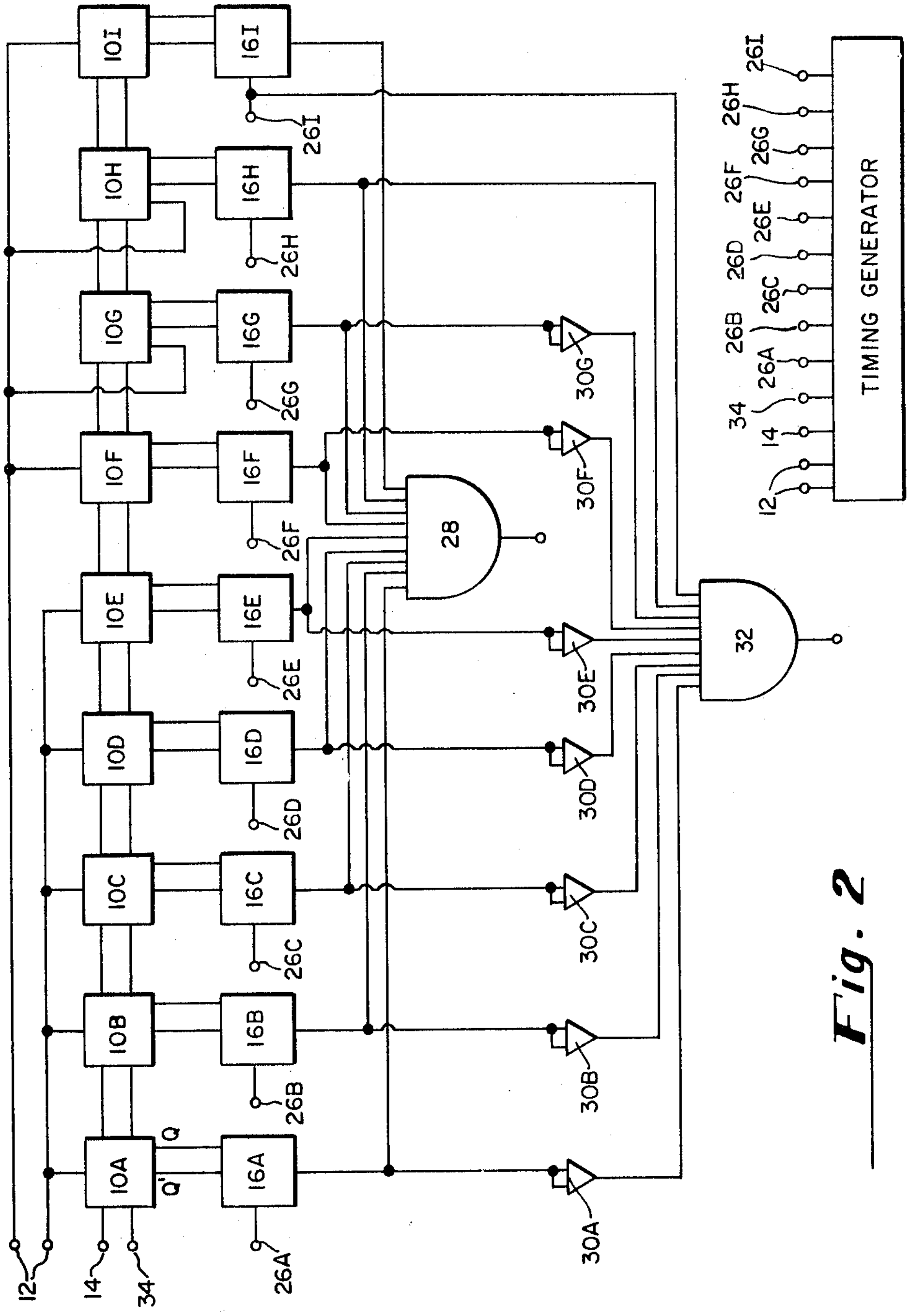
FIG. 2 is a schematic circuit diagram of a symmetrical function generator in accordance with the invention.

Referring to FIG. 2, binary counter 10 (an up-down counter) having stages 10A–10I receives a reset pulse over terminals 12 at the end of the last viewable raster line which sets counter 10 to the binary equivalent of 191 or 010111111. Timing signals at the raster scan rate, i.e., once per raster line, are applied to input terminal 14 of stage 10A. Counter 10 is thereby decremented by 1 at the end of each raster line.

Stage 10A has Q and Q′ outputs which are inputs to exclusive OR-stage 16A.

Figure 3:
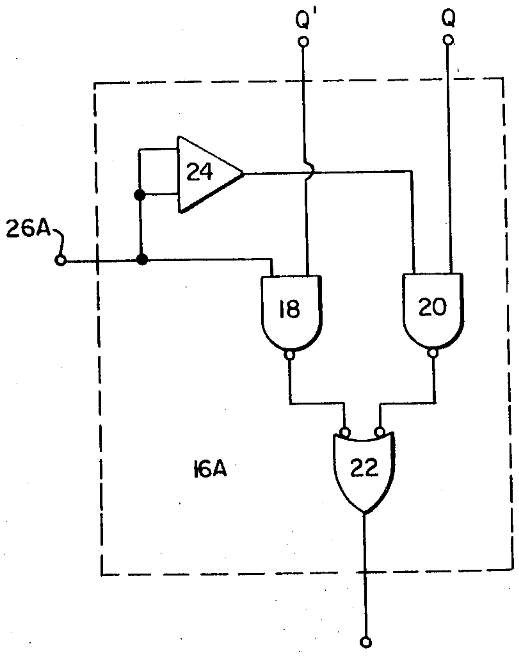
FIG. 3 is a schematic circuit diagram of gating stage 16A of FIG. 2.

Referring to FIG. 3, exclusive OR-stage 16A comprises NAND-gates 18–24. NAND-gates 18 and 20 perform the AND function, NAND-gate 22 performs the OR function, and NAND-gate 24 performs the inversion function. At terminal 26A a timing signal is received which is applied directly as one input to NAND-gate 18, and inverted by NAND-gate 24 and applied as one input to NAND-gate 20. The other inputs to NAND-gates 18 and 20 are respectively the Q′ and Q outputs of counter stage 10A. These outputs, it will be recalled, will stay constant for the duration of each raster line scan. Consequently, the output of NAND-gate 22 will switch between high and low at the rate of the timing signal at terminal 26A.

The remainder of the exclusive OR-stages 16B–16I are similar in construction and functioning to stage 16A; however, the timing signals applied to terminals 26B–26I differ. The timing signal applied to terminal 26A is at a first level for the duration of one scan element and then changes to a second level, so that there is a change in the signal for each element ($2^0$). Exclusive OR-stage 16B has a timing signal applied to terminal 26B which stays at each level for the duration of two scan elements ($2^1$). The timing signals increase in duration in a binary manner for each successive exclusive OR-stage so that stage 16I has a half cycle equal to the duration of 256 scan elements ($2^8$).

The logic is so designed and connected that an output signal will be produced by AND-gate 28 when the raster scan reaches the element having the number set in counter 10. That is, when exclusive OR-stages 16A–16I reach a setting equivalent to the number in counter 10, AND-gate 28 is enabled. The output of AND-gate 28 is utilized to produce the leading (or left) edge of the triangle as viewed in FIG. 1.

Although a signal to produce the trailing edge of the triangle could be achieved by duplicating the exclusive OR stages heretofore described, in accordance with the invention the symmetrical function is obtained in a much simpler manner. Inverters 30A–30G are connected to receive the outputs of exclusive OR-stages 16A–16G. The inverted outputs are applied as seven inputs to AND-gate 32. Another input to AND-gate 32 is the output of exclusive OR-stage 16H. This output is not inverted. The final input to AND gate is connected to the input at terminal 26I of exclusive OR stage 16I. This connection is designed to maintain this input to AND-gate 32 at the same level (in this case the binary zero level) during the time periods involved.

In the table below examples are given of elements whose number would be contained in counter 10 during various raster line scans, 191, 188, and 125. These are elements on the leading side of the triangle. Immediately below these elements are the corresponding elements or complements for the trailing side of the triangle, 192, 195, and 256. It should be observed that the binary indicators (0 or 1) are opposite in columns A through G for the leading and trailing edge elements on any raster line. This is, of course, the result of the inverters 30A–30G. By the same token, the binary indicators in column H are the same for both elements since there is no associated inverter. In column I, on the other hand the leading edge element indicator is kept at 0.

| Decimal Equivalents | 1 | 2 | 4 | 8 | 16 | 32 | 64 | 12 8 | 256 |
|---|---|---|---|---|---|---|---|---|---|
| Element Number | Counter 10 Stages A | B | C | D | E | F | G | H | I |
| 191 | 1 | 1 | 1 | 1 | 1 | 1 | 0 | 1 | 0 |
| 192 | 0 | 0 | 0 | 0 | 0 | 0 | 1 | 1 | 0 |
| 188 | 0 | 0 | 1 | 1 | 1 | 1 | 0 | 1 | 0 |
| 195 | 1 | 1 | 0 | 0 | 0 | 0 | 1 | 1 | 0 |
| 127 | 1 | 1 | 1 | 1 | 1 | 1 | 1 | 0 | 0 |
| 256 | 0 | 0 | 0 | 0 | 0 | 0 | 0 | 0 | 1 |

The lack of inverters associated with exclusive OR-stages 16H and 16I is because less than the full capacity of the nine stage counter 10A–10I is being utilized. Thus if 512 elements were being dealt with instead of the 384 elements actually used, inverters would be associated with each exclusive OR stage.

In the description preceding, the function dealt with was a linear one as was the symmetrical function achieved with the complements of element numbers. In the more general case, however, other symmetrical functions such as the conics can be generated. Since counter 10 is an up-down counter it can be incremented (by pulses at terminal 34) or decremented as desired for each scan line.

Generally, the scan lines can be considered *y* coordinates which will change regularly at the end of each scan line, and the elements as *x* coordinates which can be achieved by the count placed in counter 10.

While a particular embodiment of a symmetrical function generator has been illustrated and described, it is obvious that changes and modifications can be made without departing from the spirit of the invention and the scope of the appended claims.

I claim:

1. In a system for generating a function having *x* and *y* coordinates in which the *y* coordinate is changed unit by unit in a regular time interval, including a counter having a plurality of stages in which the initial *x* coordinate is set in a binary form and which is updated to contain the *x* coordinate associated with the next *y* coordinate at the end of each of said regular time intervals, gating stages connected to each of said counter stages, timing means connected to each of said gating stages producing signals representing in a binary form each successive *x* coordinate, and a first comparator connected to said gating stages for producing an output signal when the timing signals received by the gating stages represent the *x* coordinate contained in said counter stages, the improvement of a symmetrical function generator comprising:
- inverters connected to said gating stages; and
- a second comparator connected to receive the outputs of said inverters whereby an output signal will be produced when the timing signals received by the gating stages represent the complement of the *x* coordinate contained in said counter stages and a symmetrical function is generated.

2. In a raster-type display system having I-raster scan lines each of which contains J-elements on which is to be displayed a mathematical function having first and second symmetrical horizontal coordinates for each vertical coordinate, a circuit for generating signals indicating the occurrence of the horizontal coordinates comprising:
- a counter having stages sufficient to contain in binary form the number of the largest horizontal coordinate;
- means to set said counter at the completion of the Ith scan line to the number of the first horizontal coordinate associated with the first vertical coordinate of said function;
- a gating stage connected to each of said counter stages;
- timing means connected to each of said gating stages setting said gating stages successively to the number of each horizontal coordinate;
- each of said gating stages being enabled when its timing signal matches the output signal of its associated counter stage;
- a first AND gate connected to receive the outputs of all said gating stages and producing an output signal when all of said gating stages are enabled indicating the occurrence of the first horizontal coordinate;
- inverting means for changing the number of the first horizontal coordinate to the number of the second horizontal coordinate;
- a second AND gate connected to receive the outputs of said inverting means and producing an output signal indicating the occurrence of the second horizontal coordinate; and
- means for changing the number contained in said counter at the completion of each scan line to that of the first horizontal coordinate associated with the vertical coordinate of the next scan line.

* * * * *